3,068,185
METHOD FOR PREPARING AQUEOUS DISPERSIONS OF CLAY COATED WITH POLYMERS OF ETHYLENICALLY UNSATURATED MONOMERS AND AQUEOUS FILM FORMING COMPOSITIONS PRODUCED THEREBY
Paul Stamberger, Baltimore, Md., assignor to Minerals & Chemicals Philipp Corporation, a corporation of Maryland
No Drawing. Filed June 13, 1958, Ser. No. 741,742
9 Claims. (Cl. 260—29.6)

The instant invention relates to clay surface treated with a catalyst to permit incipient polymerization of a polymerizable ethylenically unsaturated monomer to take place at the surface of said clay. The invention relates also to novel polymeric compositions including clay and to a novel method for preparing said polymer coated clay involving the use of clay pre-coated with catalyst. More specifically, the invention relates to clay having a catalyst, preferably of the free-radical-forming type, sorbed on the surface thereof, thereby to provide a locus for initiation of addition polymerization at the clay surface; the invention relates also to clay particles coated with a film of a polymerized ethylenically unsaturated monomer and to a method of preparing said coated clay particles involving polymerizing a monomeric compound in the presence of clay which has had an catalyst of the free-radical-forming type sorbed on the surface thereof. The invention relates also to novel water-based pigmented coating compositions which are provided by the method of my invention.

It is well-known to those skilled in the art that the properties of clay minerals may be varied by surface modification thereof, whereby the utility of the clay is considerably extended. Innumerable proposals for effecting such modification have been proffered heretofore, some involving physical modification and others depending on chemical reaction between reactible constituents on the clay surface and the modifying compound. Valuable properties have been imparted to the clay by such surface modification particularly when the coating is of a uniform character.

Attempts to coat uniformly clay particles by dispersion polymerization techniques with a film of an ethylenically unsaturated monomer, such as vinyl compound or an acrylate, have heretofore met with little success; other polymerization techniques, such as bulk polymerization methods have not been effective because of the lack of uniform deposition of polymer in the clay mass and tendency of the coated clay particles to aggregate during polymerization. Such problems are not encountered, however, when a substantial quantity of monomer is polymerized in the presence of minor quantities of clay. For example, acrylic monomers may be polymerized in the presence of small amounts of clay or other powdered inorganic materials which serve to prevent adhesion of the beads of polymeric granules or powders which are provided by dispersion polymerization technique, as in accordance with the method of U.S. Patent No. 2,171,765 to Rohm et al. Therein a monomeric compound is added to an aqueous suspension of a relatively small amount of finely divided solid and subjected to polymerizing influence and agitation. A catalyst of the free-radical-forming type may be added to the water or to the monomer when necessary.

Water-based coatings have met widespread consumer acceptance because the fire hazard associated with certain constituents of conventional coatings employing organic liquid vehicles is obviated. Although many water-based pigmented coating compositions are available there exists a need for such a composition having high pigment concentrations in the vehicles without sacrifice of water-resistance. In the absence of adequate pigment concentration, multiple applications of the coatings are required to produce the requisite film opacity. The need exists particularly for a water-based coating of good covering power, water-resistance and adhesion to metallic substrates. Water-based coating compositions heretofore available are not suitable for coating metallic surfaces because of their lack of adhesion to the metal. Hence, the benefits of using water-based protective coating compositions are not available to those in the metal coating industry.

Accordingly, it is a principal object of my invention to provide clay modified to render said clay amenable to reception of a monomer to form a polymeric coating thereon.

A further object of my invention is to attach as by sorption on the surface of particulate clay an initiator for polymerization, whereby, upon addition of a polymerizable unsaturated monomer thereto, incipient polymerization occurs at the clay surface.

Another important object of my invention is the provision of clay coated with a high molecular weight polymeric film comprising the polymer of an ethylenically unsaturated monomer.

Another object of my invention is the provision of a novel method to polymerize to a relatively high molecular weight a small quantity of a polymerizable ethylenically unsaturated monomer in the presence of a large quantity of clay whereby polymerization of the monomer is initiated on the surface of said clay.

Another object of my invention is the provision of a novel method to polymerize a relatively small quantity of a polymerizable ethylenically unsaturated monomer in the presence of clay whereby all or substantially all of said monomer polymerizes to a relatively high polymer on the surface of individual clay particles and the resultant polymer coated clay particles are obtained in discrete form.

A further important object of the instant invention is to provide water-based coating compositions of high pigment concentration.

Another object of the invention is the provision of water-based coating compositions which, after application to a base material, provide opaque films of outstanding water-resistance.

Still another object of my invention is the provision of pigmented water-based coating compositions which can form films of excellent adhesion to metals.

Further objects and advantages of my invention will be apparent from the description thereof which follows.

The instant invention is a result of my discovery that a polymerizable ethylenically unsaturated monomer may be polymerized to a high molecular weight in at least partially film-forming quantity on the surface of finely divided clay particles if, prior to association of said clay with the monomeric compound, the surface of said clay is treated with a compound which is a catalyst for the polymerization of said monomer, preferably by free-radical formation. The method of polymerization is such that microscopic examination does not reveal the presence of polymer particles formed apart from the clay. However, the state of association of the initiator on the clay surface at the time the polymerization reaction proceeds and thus at the time when the polymer formation on the surface of the clay takes place, may differ from its state when initially sorbed on the clay.

I have found, furthermore, that when polymerization of a film-forming quantity of a polymerizable mono-ethylenically unsaturated monomer is effected in the presence of an aqueous dispersion of catalyst-treated clay, the aqueous dispersion of polymer coated clay which is thus provided has outstanding utility as a pigmented water-based coating composition. Said water-dispersion of polymer coated clay has outstanding hiding power when applied to a base material in a film-forming quantity because of the high pigment concentration. Furthermore, by virtue of the polymeric coating surrounding individual clay pigment particles, outstanding water-resistance is realized by suitable heat treatment of films prepared from said aqueous dispersion of polymer coated clay.

Briefly, in accordance with my invention, I treat particulated clay with a small quantity of a compound which acts to initiate the polymerization of a polymerizable ethylenically unsaturated monomer, preferably by free-radical formation. In the preparation of my novel polymer coated clay product, I disperse the catalyst-treated clay in a fluid reaction medium, add to the dispersed clay an ethylenically unsaturated monomeric compound containing at least one ethylenic double bond as the sole aliphatic carbon to carbon unsaturation and subject the monomeric compound to polymerizing influence. The ultimate polymeric product according to the present invention is a dispersion of essentially discrete particles, said particles comprising clay having a surface film of a polymeric ethylenically unsaturated compound. If desired the polymeric product may be used to form clay pigmented films, which films, after mild baking, are characterized by a high degree of water-resistance since the dispersibility of the polymer coated clay in water is thereby destroyed. In the polymeric composition of my invention, the molecular weight of the polymer may vary according to conditions under which polymerization is effected; the molecular weight of the polymer is at least 5,000 and is preferably within the range of from about 10,000 to 100,000.

I have found that, in the novel process of my invention, the presence of the catalyst, particularly a free-radical-forming catalyst, on the clay surface alters substantially the progress of the polymerization from what it would be if I were to polymerize an ethylencially unsaturated monomer in the presence of dispersed clay by dispersion polymerization technique in which the catalyst is charged to the monomer or the liquid of the continuous phase, in accordance with the methods of the prior art. I have found that, when polymerizing small quantities of ethylenically unsaturated monomers in the presence of a preponderating amount of water-dispersed clay, low molecular weight polymeric granules formed apart from the clay result when the free-radical-forming catalyst acts either in the water phase only or in the monomer itself. The difference in the polymeric compositions produced by these methods from compositions provided by my novel process indicates that, in my process, the free-radical-forming catalyst, by virtue of its ability to act when on the clay surface, functions in a unique way to alter the course of the polymerization.

More specifically, in accordance with an embodiment with my invention, I adsorb on the surface of a clay mineral a so-called "free-radical-forming initiator or catalyst." Compounds falling within the compass of this term are not truly catalysts, as is known to those skilled in the art, because the free radicals of which these compounds are the precursors enter into the polymeric unit, initiating and terminating chains. Since, by general acceptance, they are termed "catalysts" I shall for simplicity's sake, refer to such compounds as "catalysts," although more properly they are called "initiators."

Since my process for coating clay with a polymeric material is carried out in a fluid medium, the catalyst which I attach, for example, by force of sorption to the clay surface should be one which is not readily removed from the clay by the fluid medium. For this reason, in that preferred embodiment of my invention in which polymerization is effected in the presence of water, the catalyst with which I treat the clay prior to polymerization exhibits limited water solubility and can be kept on the surface of the clay by forces of adsorption. Particularly suitable catalysts have, in general, a water solubility not in excess of about 2 grams in 100 ml. water at 200° C. One of the groups of catalysts which I employ are organic "per" compounds, including di-tert.-butyl peroxide, acetone peroxide, lauroyl peroxide, methyl ethyl ketone peroxide, tert.-butyl hydroperoxide, cumene hydroperoxide. Organic percarbonates, such as ethyl percarbonate, may also be used. Inorganic "per" compounds, such as hydrogen peroxide, sodium peroxide, ammonium persulfate, potassium persulfate, perborates, etc., may be used, particularly if polymerization is accomplished at sufficiently low temperatures to preclude premature desorption from the clay surface, or if micelles are formed on the surface of the clay particles thereby providing loci for polymerization. I may also employ azo type polymerization catalysts which are characterized by the presence of —N—N— groups in the molecule to which may be attached a wide variety of organic radicals with each one, however, being preferably attached to a tertiary carbon atom. Typical suitable azo compounds include alpha, alpha'-azodiisobutyronitrile and diazonium halides. These various initiators or catalysts hereinabove mentioned differ from each other in the activation energy required to open the critical bond in the molecule of the initiator, which bond is usually a —O—O, —C—N, or —C—O-bond. Hence, some initiators, such as certain aliphatic azodinitriles and certain hydroperoxides, act at relatively low temperatures of the order of 40 to 50° C.; others, such as peroxides and aliphatic azodiesters, require temperatures as high at 150 to 175° C. to decompose into free radicals.

In the preparation of my novel polymer coated clay composition, it is desirable to at least initiate polymerization of the monomer at a relatively low temperature to prevent the catalyst from acting outside the clay surface.

The clay which I use in my process is preferably kaolin clay although other clays, such as illite, chlorite, sepiolite, attapulgite and sub-bentonite, may be satisfactory. Kaolin clay is preferred because of the outstanding properties of films prepared by the polymerization process of my invention when kaolin clay is used. The term kaolin clay refers to an aluminosilicate mineral of the general formula $Al_2O_3 \cdot nSiO_2 \cdot xH_2O$ in which $x$ is usually 2 and the weight ratio of $SiO_2$ to $Al_2O_3$ is ordinarily within the range of 1.0 to 1.5, and usually about 1.18. Kaolin clay represents several distinct species, kaolinite, anauxite, halloysite, nacrite and dickite. I may also use the variety of halloysite having a formula like the one characterizing the kaolin clays but having approximately double the lattice water of kaolin clays. The clay may be used in the raw state after suitable crushing, drying, and classification or may be variously processed, such as by calcination, to control water dispersibility, color, etc., such processes being well-known to those skilled in the art. So-called "activated clays" may be used although such clays in the dry state promote the polymerization of certain unsaturated compounds. When such activated clays are wet, as they are under the preferred conditions of polymerization which I employ, their catalytic activity is eliminated and they will not interfere with the action of the free-radical-forming catalyst.

The ultimate particle size of the clay which I use may vary within a relatively wide range. Suitable clay can be suspended in water without irreversible gel formation when such a suspension has a high solids content, such as 20% or greater. I may use, for example, clay having an average equivalent spherical diameter in excess of about 0.1 micron in preparing the polymeric coated clay product. When the product is used in forming a protective coating or otherwise used in film formation as hereinafter described, I prefer the use of relatively fine clay, such as clay having an average equivalent spherical diameter within the range of from about 0.5 to 5.0 microns. The particle size of the clay is readily ascertained by sedimentation methods well-known to those skilled in the art.

I may attach the catalyst to the clay by any suitable means which, by way of example, may be accomplished by sorption of the catalyst in liquid or vapor phase, or from solution or suspension. The selected mode of adsorption will depend principally on the vapor pressure characteristics of the catalyst and its affinity for the surface of the aluminosilicate surface. Ordinarily, the amount of catalyst which I sorb is within the range of from about 0.1 to 4.0%, based on the weight of the clay, depending on the amount and type of monomer used and the proportions thereof and depending, furthermore, on the specific polymerization conditions employed. Variations from this percentage range may be indicated in some instances. The optimum catalyst concentration quantity is readily determined experimentally. Since the sorbed catalyst tends to decompose on standing, the clay-catalyst adsorbate should be used shortly after its preparation to prevent loss of catalyst. For example, I have found that when tert.-butyl hydroperoxide is sorbed on the clay to the extent of 3.50%, based on the weight of the clay, the tert.-butyl hydroperoxide content is reduced to 3.20% on the second day, 2.70% on the fifth day, 2.30% on the ninth day, and after forty days is reduced to 1.5%.

In carrying out the process of my invention, I disperse in water the clay with catalyst adsorbate, employing a dispersant when necessary to prevent flocculation of the clay. By way of example of dispersants can be mentioned alkaline polyphosphates, such as tetrasodium pyrophosphate, sodium tripolyphosphate, the corresponding potassium compounds, ammonium hydroxide and alkali and alkaline earth metal salts of lignousulfonic acids. The dispersant is used in small quantity only, usually about .05 to 2.0%, based on the weight of the clay. It is also desirable to employ a small quantity of a surface active agent which will enhance polymerization. Suitable surface active agents include, alkyl sulfates and aryl alkyl sulfonates. The surface active agents may also be attached on the surface of the clay particles, for example, by adsorption or ion exchange.

The amount of water I add to the clay varies considerably and is not limited to any quantity or range of quantities. However, in general, it may be said that a clay dispersion of about 30 to 40% solids concentration will be satisfactory. The viscosity of any clay-water slurry will depend on the particle size clay, particle shape of clay and, in addition, upon the degree of flocculation of the clay.

To the dispersion of clay with catalyst adsorbate is added a polymerizable monomeric ethylenically unsaturated compound and such other constituents as are used in dispersion polymerization techniques, e.g., surface active agents, plasticizers and components to produce a "redox" system, as will be hereinafter described.

Polymerizable monomers which I use in my process are ethylenically unsaturated organic compounds having at least a single ethylenic double bond as the sole aliphatic carbon to carbon unsaturation and capable of undergoing addition polymerization in the presence of a compound capable of forming free radicals. Examples of monomeric monoethylenically unsaturated compounds which I may employ include: vinyl compounds such as styrene, nuclearly halogenated styrene, alkylated styrene, such as alphamethylstyrene, vinyl chloride, vinyl fluoride, vinylidene chloride, vinyl esters, such as vinyl acetate, vinyl trimethylacetate, vinyl ketones, such as vinyl methyl ketone, vinyl propyl ketone; also acrylic and alphamethacrylic acids and derivatives thereof, such as esters, amides, nitriles, chlorides and anhydride and including acrylonitrile, methacrylonitrile, allyl acrylate, methacrylamide. If desired combinations of two or more of the above polymerizable monomeric compounds may be used when they are copolymerizable. It will be familiar to all who are acquainted with the art of polymerization that polyethylenically unsaturated monomeric compounds capable of undergoing addition polymerization can be used also, e.g., dienes, such as butadiene, isoprene and 1-2 dichlorobutadiene; such monomers may be used singly or in combination with other ethylenically unsaturated compounds.

These monomeric compounds may be added directly to the aqueous clay suspension or they may be dissolved in an appropriate solvent prior to addition to the dispersion. Plasticizers and coloring may be added to the dispersion in small quantity when it is desired to modify the properties of the polymeric film deposited on the clay. A suitable plasticizer is a non-volatile compound which is known to be capable of exerting a plasticizing effect on the particular polymer.

The quantity of monomer that I employ in the provision of my novel polymeric composition is small in comparison to that of the clay. The weight ratio of monomer to clay ordinarily lies within the range of from about 5 to 30 parts of monomer to 95 to 70 parts of clay. Particularly useful compositions are realized when the weight ratio of monomer to clay is within the range of from about 10 to 25 parts of monomer to 90 to 75 parts of clay; utilizing these ratios, the weight percentage of polymer contained on the clay will usually lie within the range of from about 5 to 10%, based on the weight of the clay. Of course, the weight ratio of polymeric coating to clay in the product will depend on the monomer/clay ratio used in processing and on the efficacy of monomer conversion.

A redox system may be utilized in the preparation of my novel polymer coated clay, the purpose of the redox system being to lower the temperature at which incipient polymerization occurs, and to permit the use of initiators which normally would require elevated temperatures. Redox systems, broadly speaking, require the action of electron donors, such as ferrous ions and other reducing agents, with electron acceptors, such as peroxides or other oxidizing agents which yield, by the Fenton reaction, a small relatively constant source of free radicals.

In general, the polymerization is initiated at as low a temperature as is feasible, and utilizing a redox system when necessary to initiate polymerization at low temperature levels. After polymerization has advanced the temperature may be elevated. This temperature may be beyond that at which the reaction medium has a substantial vapor pressure when the reaction is carried out under pressure. The polymerization time varies, inter alia, with monomer being polymerized, catalyst, temperature and pressure used.

If I desire to produce a polymeric coating of lower molecular weight, I may add a chain transfer agent, such as a mercaptan, diethyl benzene, ethyl benzene or carbon tetrachloride. After about 80% of the monomer is polymerized, I may add a secondary catalyst to effect further and more complete polymerization of the monomer.

The aqueous dispersions of the polymer coated clay which are provided by my novel process are useful as water-based paint or protective coating composition wherein the modified clay acts as a pigment. Such aqueous dispersions may include conventional auxiliary pigments, dyes and plasticizers, such as are used in water-based paints. The plasticizer used may be any non-volatile material or combination of materials compatible with the polymeric coating and known to have a plasticizing effect when associated with the polymeric material. The nature of the substrate to which the novel water-based coating is applied will dictate to a large extent the preferred polymeric coating which is applied to the clay by the novel method of my invention. For example, when the substrate is cellulosic, suitable polymeric coatings for the clay will include polyacrylates, polyacrylic esters, polyvinyl esters, etc.; when a metal is the substrate, it is preferable to use a monomer of co-monomer having a carboxylic radical, such as, for example, ethylacrylate, The consistency of the coating composition comprising an aqueous dispersion of the polymer coated clay may be controlled by adjustment of the solids content of the dispersion and by control of degree of flocculation of the pigment. For example, when the dispersion is too heavily bodied for satisfactory brushing or rolling an alkaline material, particularly a volatile alkali such as, ammonia, dimethyl or monomethyl amine, may be added to the dispersion to promote deflocculation of pigment therein.

In many instances it is highly desirable to eliminate the water-dispersible character of the film formed by coating a base material with an aqueous dispersion of the polymer coated clay. This may be readily accomplished by baking the film thus formed at a relatively low temperature, such as temperatures in excess of about 100° C. and below that at which carbonization of the polymer or substrate results.

The following examples are given only for the sake of more fully illustrating my invention and are not to be construed as limiting the scope thereof.

Example I

In this example, polyethylacrylate coated kaolin clay was prepared by a dispersion polymerization technique in which the free-radical-forming catalyst was presorbed on the clay prior to polymerization of the monomer in the presence of the water-dispersed clay. The clay used was an essentially gift-free water-washed kaolin clay having in average equivalent spherical diameter of 0.5 micron. A redox system was used to control the polymerization. The materials used and the quantities were:

|  | Grams |
|---|---|
| Kaolin clay | 200.0 |
| Tert.-butyl hydroperoxide | 3.7 |
| Water | 500.0 |
| $Na_3PO_4$ | 2.0 |
| Nekal BA 75 [1] | 2.0 |
| Activator $Na_2S_2O_4$ | 0.2 |
| Ethylacrylate, inhibitor free | 30.0 |

[1] Nekal BA 75 is a foaming type, anionic water-soluble sodium alkyl naphthalene sulfonate possessing emulsifying properties.

In the first step of the preparation of the product, tert.-butyl hydroperoxide was adsorbed under 26 inches vacuum by the clay. The amount of catalyst adsorbed was calculated from measurement of weight increase of the clay after exposure to the catalyst. The treated clay was then dispersed in the water in which the $Na_3PO_4$ and Nekal BA 75 were dissolved. This composition was transferred to a reactor with agitator and the other ingredients added in following order: ethylacrylate, $Na_2S_2O_4$. Polymerization was carried out under a nitrogen blanket at atmospheric pressure.

At the commencement of polymerization the temperature was held at 30° C. and was gradually raised to about 90° C. at the termination of the polymerization which occurred about 4 hours later. At the end of the polymerization, the product was an aqueous dispersion of a non-aggregated finely divided reaction product; the slurry having a pH of 7.2. The polymeric constituent of the slurry had a particle size similar to that of the clay stock used in preparing the product; 5.8% by weight of the palymeric powder was extractable by toluene.

The aqueous dispersion was coated on paper and the coating was dried at about 80° C. for about 30 minutes. The resultant film was flexible and had semi-gloss properties and was not redispersible in water; when coated on a steel panel and baked at about 200° C., a tough opaque protective film resulted.

Example II

Kaolin clay was coated with polyethylacrylate using methyl ethyl ketone peroxide as a polymerization catalyst. Polymerization was carried out using dispersion polymerization technique in which the free-radical-forming catalyst was presorbed on the clay prior to polymerization of ethylacrylate in the presence of water-dispersed clay. The clay was an essentially grit-free, water-washed kaolin clay having an average equivalent spherical diameter of 0.5 micron. A redox system was used to control the polymerization.

The materials used and the quantities thereof were:

|  | Grams |
|---|---|
| Kaolin clay | 250.0 |
| Methyl ethyl ketone peroxide | 1.5 |
| Water | 500.0 |
| Darvan #30 [1] | 2.0 |
| $Na_3PO_4$ | 1.0 |
| $Na_2S_2O_4$ | 0.25 |
| $FeSO_4$ | 0.005 |
| Ethylacrylate, inhibitor free | 25.0 |

[1] Darvan #30 is a water-soluble dispersing agent consisting of the sodium salt of polymerized alkyl aryl sulfonic acid.

In the preparation of the product, vaporous methyl ethyl ketone peroxide was adsorbed under 26 inches vacuum by the clay. The clay with adsorbate was then dispersed in the water to which the $Na_3PO_4$ and Darvan #30 had been added. The dispersion was transferred to a closed reactor and $Na_2S_2O_4$, $FeSO_4$ and ethylacrylate added in that order and processed as in Example I. Polymerization was initiated at about 30° C. and gradually raise to about 90° C. at the end of a 4 hour period.

The product was an aqueous dispersion (pH 6.2) of a finely divided reaction product; the particle size of the product being similar to that of the clay stock. 4.7% by weight of the polymeric powder was extractable by toluene.

The aqueous dispersion of the reaction product was coated on paper and the coating was dried at about 80° C. for about 30 minutes. The resultant semi-gloss, flexible film was not redispersible in water. The dispersion was coated on a steel plate, baked at about 200° C. to provide a tough protective coating.

Example III

Kaolin clay was coated with a film of a copolymer of ethylacrylate and acrylamide by polymerizing monomeric ethylacrylate and acrylamide in the presence of water-dispersed kaolin clay having tert.-butyl hydroperoxide adsorbed thereon.

The ingredients used were:

|  | Grams |
|---|---|
| Kaolin clay (0.5 micron) | 200.0 |
| Tert.-butyl hydroperoxide | 6.4 |
| Water | 500.0 |
| Tri-potassium polyphosphate | 2.0 |
| Ethylacrylate | 15.0 |
| Acrylamide | 5.0 |

In the preparation of the coated clay composition tert.-butyl hydroperoxide was adsorbed from the vapor phase under vacuum on the clay. The dispersant, tri-potassium polyphosphate, was dissolved in the water and the treated clay dispersed therein. The dispersion was transferred to an agitated reactor, not closed; ethylacrylate and acrylamide were added to the dispersion in the stated proportions and polymerized under a nitrogen blanket for about 4 hours at a temperature within the range of about 30 to 90° C. The pH of the resutlant dispersion was 6.4.

The dispersion produced as above was coated on paper, dried and baked at 80° C. for 30 minutes. The film thus formed was water-resistant, although somewhat to a lesser degree than films formed from compositions prepared in accordance with Examples I and II.

Example IV

The procedure of Example I was repeated with the concentration of the ethylacrylate doubled and the quantity of catalyst correspondingly increased. Furthermore, to ascertain the degree of sorption of the catalyst by the clay, the active oxygen content of the catalyst-treated clay was calculated. Also studied was the polymer content of the clay and the amount of said polymer extractable by toluene.

The materials used in the polymerization were:

| | Grams |
|---|---|
| Kaoline clay (0.5 micron) | 300.0 |
| Tert.-butyl hydroperoxide | 6.0 |
| Water | 500.0 |
| $Na_3PO_4$ | 2.0 |
| Nekal BA 75 | 2.0 |
| Ethylacrylate, inhibitor free | 60.0 |
| $Na_2S_2O_4$ | 0.2 |
| $FeSO_4$ | 0.005 |

The measured active oxygen content of the catalyst-treated clay was 0.0022 gram per gram clay.

The active oxygen was determined by the Treadwell and Hall method as follows: Ten grams of clay with catalyst adsorbate was placed in a flask along with 200 ml. of water, one drop of mercury and 20 ml. of 10% KI solution; the content of the flask was acidified and the flask closed with a stopper and agitated to prevent local iodide separation from taking place. The flask was permitted to stand for 4 hours and the iodide titrated with $\frac{1}{10}$ N $Na_2S_2O_3$, using starch as the indicator.

The solids concentration of the dispersion after polymerization was completed was 40%. The coated clay content of the dispersion had a particle size which was essentially that of the untreated clay. From the total loss of organic material by ignition the maximum polyethylacrylate content was estimated to be 11%, based on the weight of the clay (this figure includes also the catalyst content). The polyethylacrylate content which was extractable by toluol was 8.8%, based on the weight of the coated clay.

The dispersion produced after polymerization was completed was coated on paper and the film baked at 100° C. for 30 minutes. The baked films were tough and flexible and had good water-resistance.

Example V

An excellent coating composition for metals was prepared, in accordance with the method of my invention, by sorbing a mixture of free-radical-forming catalyst on kaolin clay, dispersing the catalyst coated clay in water and copolymerizing ethylacrylate and methacrylic acid by dispersion polymerization techniques.

In the preparation of the water-based coating composition 0.35 gram of methyl ethyl ketone peroxide and 1.70 grams of tert.-butyl hydroperoxide were sorbed, from their vaporous state, on 350 grams of kaolin clay. The measured active oxygen content was 0.00083 gram per gram clay.

The catalyst-treated clay was dispersed in 500 grams of water having dissolved therein $Na_3PO_4$, 2 grams, and Nekal BA 75, 2 grams. The dispersion was transferred to a reactor and ethylacrylate, 40 grams, and methacrylic acid, 5.0 grams, $Na_2S_2O_4$, 0.2 gram and $FeSO_4$, 0.005 gram were added to the reactor in the order given. Polymerization was initiated at 30° C. and terminated at 90° C. The polymerization time was about 4 hours.

The solids content of the reaction product was 39%; the polymer coated clay content of the dispersion was in flocculated condition. The flocculated dispersion was, without deflocculation, coated on steel and the film baked at 200° C. for 15 minutes. The film had outstanding adhesion to the metal and provided an extremely tough, water-resistant protective coating for the metal.

Example VI

Polymethacrylic acid-clay composition was prepared employing the method of my example. The catalyst, in this example, was $(NH_4)_2S_2O_8$ which was sorbed by the clay from a water solution of the catalyst. Polymerization of the methacrylic acid was carried out in the presence of water-dispersed catalyst-treated clay.

The materials used in the preparation of the product were:

| | Grams |
|---|---|
| Kaolin clay (0.5 micron) | 250.0 |
| $(NH_4)_2S_2O_8$ | 0.5 |
| Water | 500.0 |
| Darvan #30 | 2.0 |
| $Na_2S_2O_4$ | 0.25 |
| $FeSO_4$ | 0.005 |
| Methacrylic acid (0.25% hydroquinone methyl ether stabilized) | 20.0 |

Polymerization was carried out under a nitrogen blanket for about 4 hours during which time the temperature increased gradually from 30 to 90° C. The thick slurry which resulted after polymerization was completed had a pH of 3.2. To deflocculate the dispersion, monomethylamine was added until the slurry was neutral.

The neutral dispersion was coated on a steel plate and baked at temperatures within the range of from 120 to 200° C. The baked films were extremely tough.

I claim:

1. A method for preparing a polymer coated clay composition which comprises:
   dispersing in water kaolin clay the particles of which have sorbed thereon a small quantity of a free-radical generating addition polymerization initiator;
   mixing into said dispersion at least one monoethylenically unsaturated monomer which is polymerizable solely by addition through aliphatic carbon to carbon unsaturation,
   said monomer being employed in an amount within the range of from about 5 to 30 parts by weight to 95 to 70 parts by weight of said kaolin clay;
   and heating said dispersion at a temperature below which the dispersion has appreciable vapor pressure thereby to form an aqueous dispersion of polymer coated clay.

2. The method of claim 1 including the additional step of separating the polymer coated clay particles from a liquid phase of said dispersion.

3. A method for preparing a polymer coated clay composition which comprises:
   dispersing in water kaolin clay the particles of which have sorbed thereon a small quantity of a free-radical generating addition polymerization initiator;
   mixing in said dispersion at least one monoethylenically unsaturated monomer which is polymerizable solely by addition through aliphatic carbon to carbon unsaturation,
   said monomer being employed in an amount within the range of from about 5 to 30 parts by weight to 95 to 70 parts by weight of said kaolin clay;
   and, while agitating said dispersion, subjecting said monomer to polymerizing influence, initially at a temperature of about 30° C. and thereafter at an elevated temperature below which the system has appreciable vapor pressure, so as to form an aqueous dispersion of polymer coated clay.

4. The method of claim 3 wherein said initiator is an organic peroxide compound and is sorbed on said clay in amount of from about 0.1% to 4.0% by weight.

5. A method for preparing an aqueous dispersion of polymer coated kaolin clay useful as a water-based coating composition which comprises:
   forming a 30% to 40% solids aqueous dispersion of kaolin clay the particles of which have sorbed thereon a small amount of a free-radical generating addition polymerization initiator;

said dispersion containing a dispersant for said clay and an anionic water-soluble surface active agent;

mixing into said dispersion at least one monoethylenically unsaturated monomer which is polymerizable solely by addition through aliphatic carbon to carbon unsaturation, said monomer being employed in an amount within the range of from about 5 to 30 parts by weight to 95 to 70 parts by weight of said clay;

and, while agitating said dispersion, subjecting said monomer to polymerizing influence, initially at a temperature of about 30° C. and thereafter at elevated temperature below which the system has appreciable vapor pressure, so as to form an aqueous dispersion of polymer coated clay.

6. The method of claim 5 wherein said monomer is ethylacrylate.

7. The method of claim 5 wherein said initiator is an organic peroxide.

8. An aqueous clay pigmented film-forming composition comprising the water dispersed polymer coated clay product of claim 1.

9. A method for forming a water-resistant pigmented film on metal which comprises:

coating the surface of metal with an aqueous dispersion of polymer coated clay, said dispersion having been prepared as set forth in claim 5;

and baking the coating at a temperature in excess of 100° C. and below that at which carbonization of said polymer takes place, thereby forming a nondispersible water-resistant pigment coating on said metal.

References Cited in the file of this patent
UNITED STATES PATENTS

| | | |
|---|---|---|
| 959,605 | Queisser | May 31, 1910 |
| 2,171,765 | Rohm et al. | Sept. 5, 1939 |
| 2,512,697 | Te Grotenhuis | June 27, 1950 |
| 2,644,772 | Kaye | July 7, 1953 |
| 2,692,868 | Berry | Oct. 26, 1954 |
| 2,772,317 | Smith | Nov. 27, 1956 |
| 2,795,568 | Ruehrwein | June 11, 1957 |
| 2,801,983 | Dixon et al. | Aug. 6, 1957 |
| 2,895,919 | Gerhart | July 21, 1959 |